United States Patent
Losey et al.

(10) Patent No.: US 8,042,586 B2
(45) Date of Patent: Oct. 25, 2011

(54) SELF-INFLATING TIRE ASSEMBLY

(75) Inventors: Robert Allen Losey, Kent, OH (US);
Robert Leon Benedict, Tallmadge, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 12/643,243

(22) Filed: Dec. 21, 2009

(65) Prior Publication Data

US 2011/0146868 A1    Jun. 23, 2011

(51) Int. Cl.
*B60C 23/12* (2006.01)
(52) U.S. Cl. .................................. 152/426; 152/415
(58) Field of Classification Search .............. 152/415, 152/419, 423, 424, 425, 426
See application file for complete search history.

(56) References Cited

U.S. PATENT DOCUMENTS

| | | | | |
|---|---|---|---|---|
| 1,050,886 A | * | 1/1913 | Wetherell | 152/426 |
| 1,134,361 A | * | 4/1915 | Wetherell | 152/426 |
| 3,304,981 A | * | 2/1967 | Sheppard | 152/426 |
| 3,833,041 A | * | 9/1974 | Glad et al. | 152/509 |
| 4,922,984 A | * | 5/1990 | Dosjoub et al. | 152/415 |
| 5,052,456 A | * | 10/1991 | Dosjoub | 152/415 |
| 7,117,731 B2 | * | 10/2006 | Hrabal | 73/146 |
| 7,225,845 B2 | * | 6/2007 | Ellmann | 152/426 |

FOREIGN PATENT DOCUMENTS

| | | | |
|---|---|---|---|
| DE | 3433318 A1 | * | 3/1986 |
| RU | 2106978 C1 | * | 3/1998 |
| WO | WO 03049958 A1 | * | 6/2003 |
| WO | WO 2005012009 A1 | * | 2/2005 |
| WO | WO 2007134556 A1 | * | 11/2007 |
| WO | WO 2010008338 A1 | * | 1/2010 |

OTHER PUBLICATIONS

Machine Translation of DE 3433318 A1.*

* cited by examiner

*Primary Examiner* — Joe Morano, IV
*Assistant Examiner* — Kip T Kotter
(74) *Attorney, Agent, or Firm* — Richard B. O'Planick

(57) ABSTRACT

A self-inflating tire assembly includes an air tube mounted within a tire sidewall groove. The air tube is in contacting engagement with opposite angled groove surfaces surrounding the air tube. A segment of the air tube is flattened from an expanded diameter to a flat diameter by bending and compression of the groove in a rolling tire footprint to force air evacuated from the flattened segment along a tube air passageway. The sidewall groove extends into an annular, axially extending, sidewall surface such as an axially oriented surface of a tire chafer protrusion located in non-contacting relationship with the rim.

19 Claims, 13 Drawing Sheets

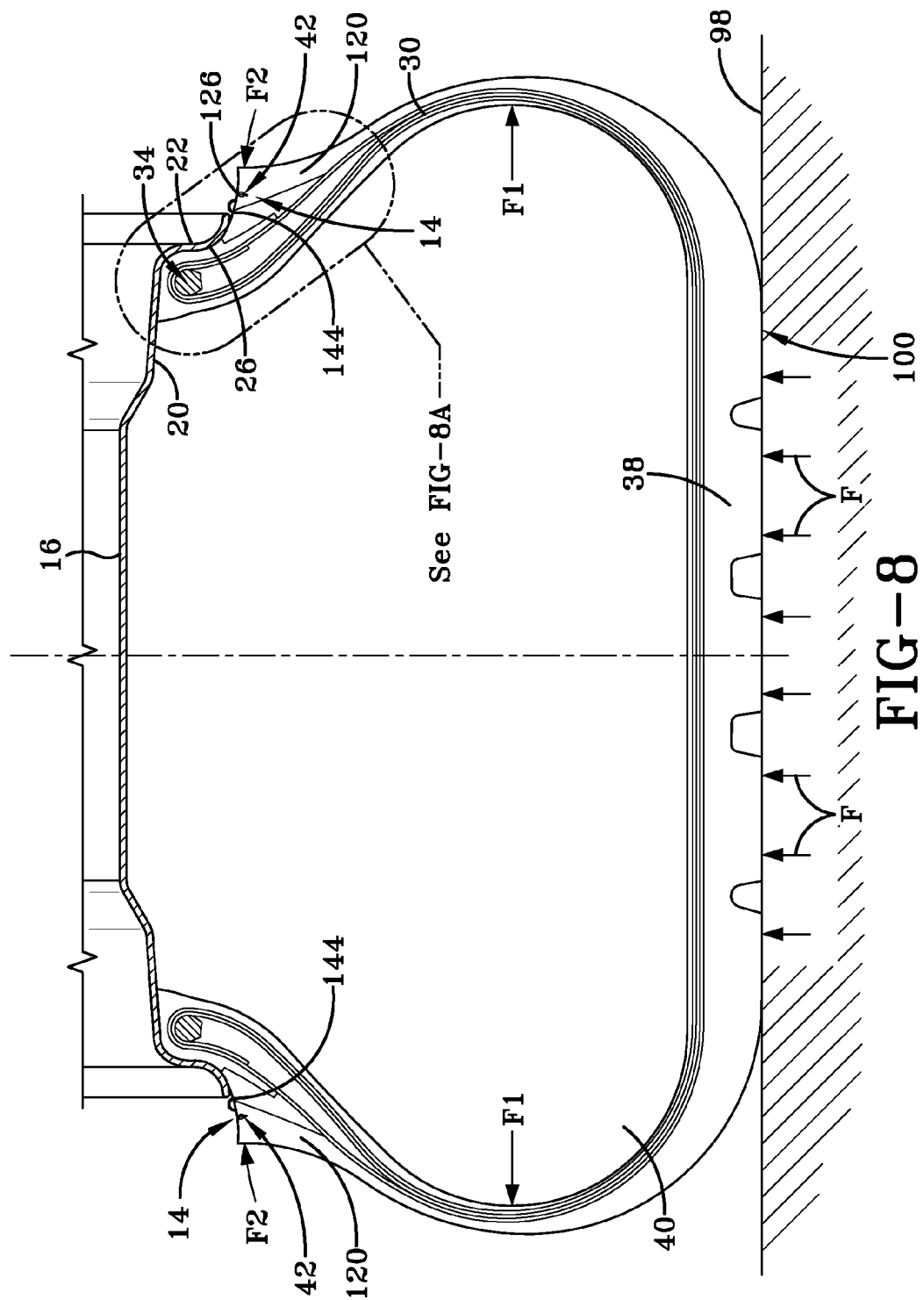

ental pressure over time. The
SELF-INFLATING TIRE ASSEMBLY

FIELD OF THE INVENTION

The invention relates generally to self-inflating tires and, more specifically, to a tire assembly incorporating a pump mechanism.

BACKGROUND OF THE INVENTION

Normal air diffusion reduces tire pressure over time. The natural state of tires is under inflated. Accordingly, drivers must repeatedly act to maintain tire pressures or they will see reduced fuel economy, tire life and reduced vehicle braking and handling performance. Tire Pressure Monitoring Systems have been proposed to warn drivers when tire pressure is significantly low. Such systems, however, remain dependant upon the driver taking remedial action when warned to re-inflate a tire to recommended pressure. It is a desirable, therefore, to incorporate a self-inflating feature within a tire that will self-inflate the tire in order to compensate for any reduction in tire pressure over time without a need for driver intervention.

SUMMARY OF THE INVENTION

According to an aspect of the invention, a self-inflating tire assembly includes a rim having a tire mounting surface extending between first and second rim flanges; a tire mounted to the rim tire mounting surface, the tire having a tire cavity, and first and second sidewalls extending respectively from first and second tire bead regions to a tire tread region. The first sidewall includes a bending region operatively bending within a rolling tire footprint responsive to a bending strain. A sidewall groove is positioned within a compression side of a neutral axis of the bending region and an air tube is positioned within the sidewall groove in contacting engagement with opposite groove surfaces at least partially surrounding the air tube. The sidewall groove operatively bends within the compression side of the bending region responsive to a bending strain within the rolling tire footprint to compress the air tube from an expanded diameter to a flat diameter adjacent the rolling tire footprint, whereby forcing evacuated air from a flattened air tube segment along the air passageway.

In another aspect, the sidewall groove is positioned within the compression side of the bending region a maximum distance from the neutral axis.

In another aspect, first and second angled groove surfaces define opposite sides of the sidewall groove. Each angled groove defining surface includes first and second tube contacting surfaces adjoining at an angled intersection. The tube contacting surfaces of the first and second angled groove surfaces operatively contact the air tube at spaced apart intervals surrounding and substantially circumscribing the air tube.

The first and second angled groove surfaces, in yet another aspect of the invention, converge and join at an inward terminal groove end and operatively flex inwardly about the terminal groove end to constrict the sidewall groove and flatten a footprint segment of the air tube within the groove.

Pursuant to another aspect of the invention, the sidewall groove extends into an annular, axially extending, sidewall surface such as an axially oriented surface of a tire chafer protrusion located in non-contacting relationship with the rim.

DEFINITIONS

"Aspect ratio" of the tire means the ratio of its section height (SH) to its section width (SW) multiplied by 100 percent for expression as a percentage.

"Asymmetric tread" means a tread that has a tread pattern not symmetrical about the center plane or equatorial plane EP of the tire.

"Axial" and "axially" means lines or directions that are parallel to the axis of rotation of the tire.

"Chafer" is a narrow strip of material placed around the outside of a tire bead to protect the cord plies from wearing and cutting against the rim and distribute the flexing above the rim.

"Circumferential" means lines or directions extending along the perimeter of the surface of the annular tread perpendicular to the axial direction.

"Equatorial Centerplane (CP)" means the plane perpendicular to the tire's axis of rotation and passing through the center of the tread.

"Footprint" means the contact patch or area of contact of the tire tread with a flat surface at zero speed and under normal load and pressure.

"Groove" means an elongated void area in a tread that may extend circumferentially or laterally about the tread in a straight, curved, or zigzag manner. Circumferentially and laterally extending grooves sometimes have common portions. The "groove width" is equal to tread surface area occupied by a groove or groove portion, the width of which is in question, divided by the length of such groove or groove portion; thus, the groove width is its average width over its length. Grooves may be of varying depths in a tire. The depth of a groove may vary around the circumference of the tread, or the depth of one groove may be constant but vary from the depth of another groove in the tire. If such narrow or wide grooves are substantially reduced depth as compared to wide circumferential grooves which the interconnect, they are regarded as forming "tie bars" tending to maintain a rib-like character in tread region involved.

"Inboard side" means the side of the tire nearest the vehicle when the tire is mounted on a wheel and the wheel is mounted on the vehicle.

"Lateral" means an axial direction.

"Lateral edges" means a line tangent to the axially outermost tread contact patch or footprint as measured under normal load and tire inflation, the lines being parallel to the equatorial centerplane.

"Net contact area" means the total area of ground contacting tread elements between the lateral edges around the entire circumference of the tread divided by the gross area of the entire tread between the lateral edges.

"Non-directional tread" means a tread that has no preferred direction of forward travel and is not required to be positioned on a vehicle in a specific wheel position or positions to ensure that the tread pattern is aligned with the preferred direction of travel. Conversely, a directional tread pattern has a preferred direction of travel requiring specific wheel positioning.

"Outboard side" means the side of the tire farthest away from the vehicle when the tire is mounted on a wheel and the wheel is mounted on the vehicle.

"Peristaltic" means operating by means of wave-like contractions that propel contained matter, such as air, along tubular pathways.

"Radial" and "radially" means directions radially toward or away from the axis of rotation of the tire.

"Rib" means a circumferentially extending strip of rubber on the tread which is defined by at least one circumferential groove and either a second such groove or a lateral edge, the strip being laterally undivided by full-depth grooves.

"Sipe" means small slots molded into the tread elements of the tire that subdivide the tread surface and improve traction, sipes are generally narrow in width and close in the tires footprint as opposed to grooves that remain open in the tire's footprint.

"Tread element" or "traction element" means a rib or a block element defined by having a shape adjacent grooves.

"Tread Arc Width" means the arc length of the tread as measured between the lateral edges of the tread.

BRIEF DESCRIPTION OF THE DRAWINGS

The invention will be described by way of example and with reference to the accompanying drawings in which:

FIG. 8 is a sectional view of an air tube, rolling tire, and rim assembly illustrating the location of the tire footprint relative to the air tube.

DETAILED DESCRIPTION OF THE INVENTION

Figure 1:
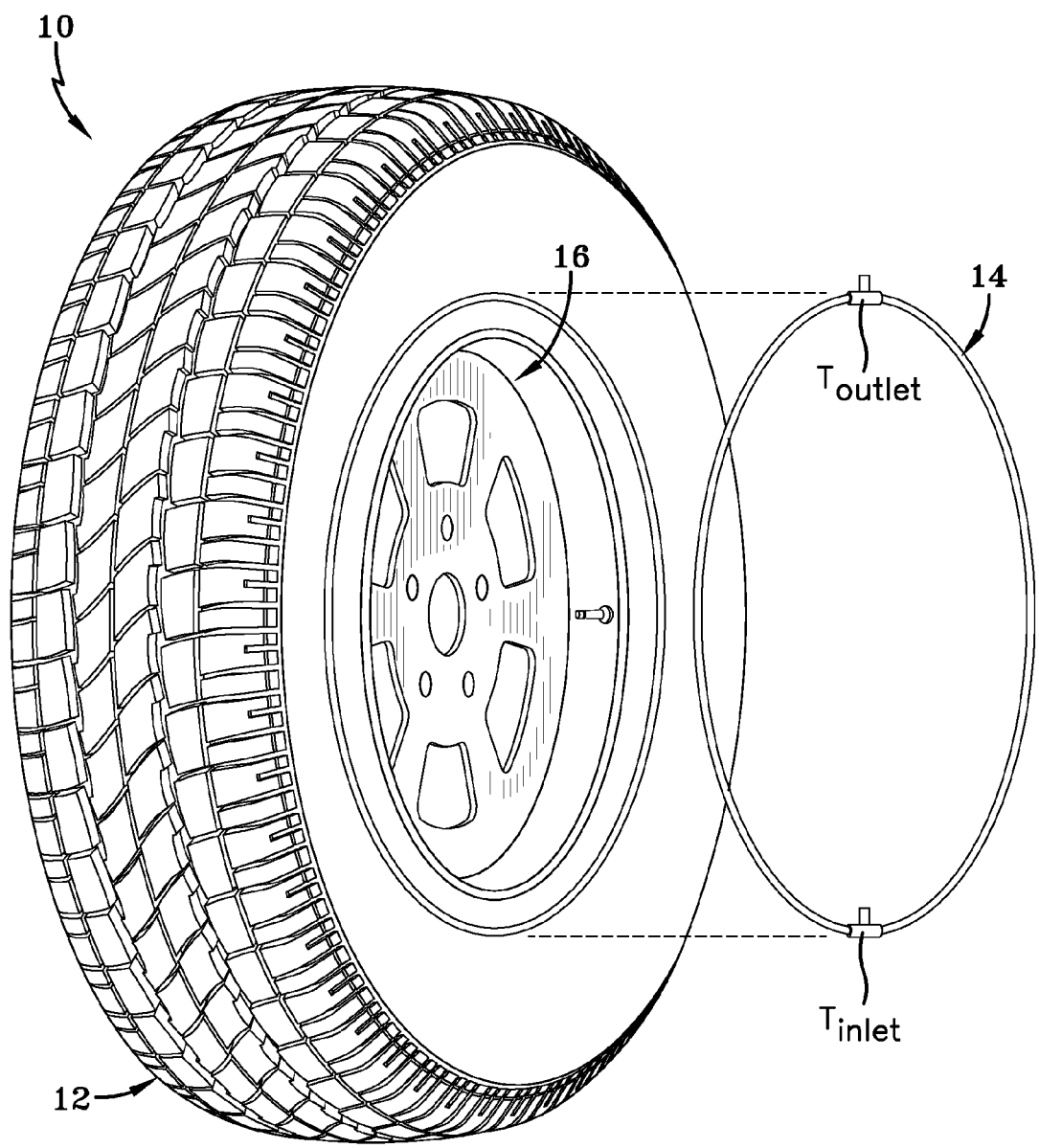
FIG. 1 is an isometric view of tire, rim and tubing with peristaltic pump and inlet valve.
Figure 2:
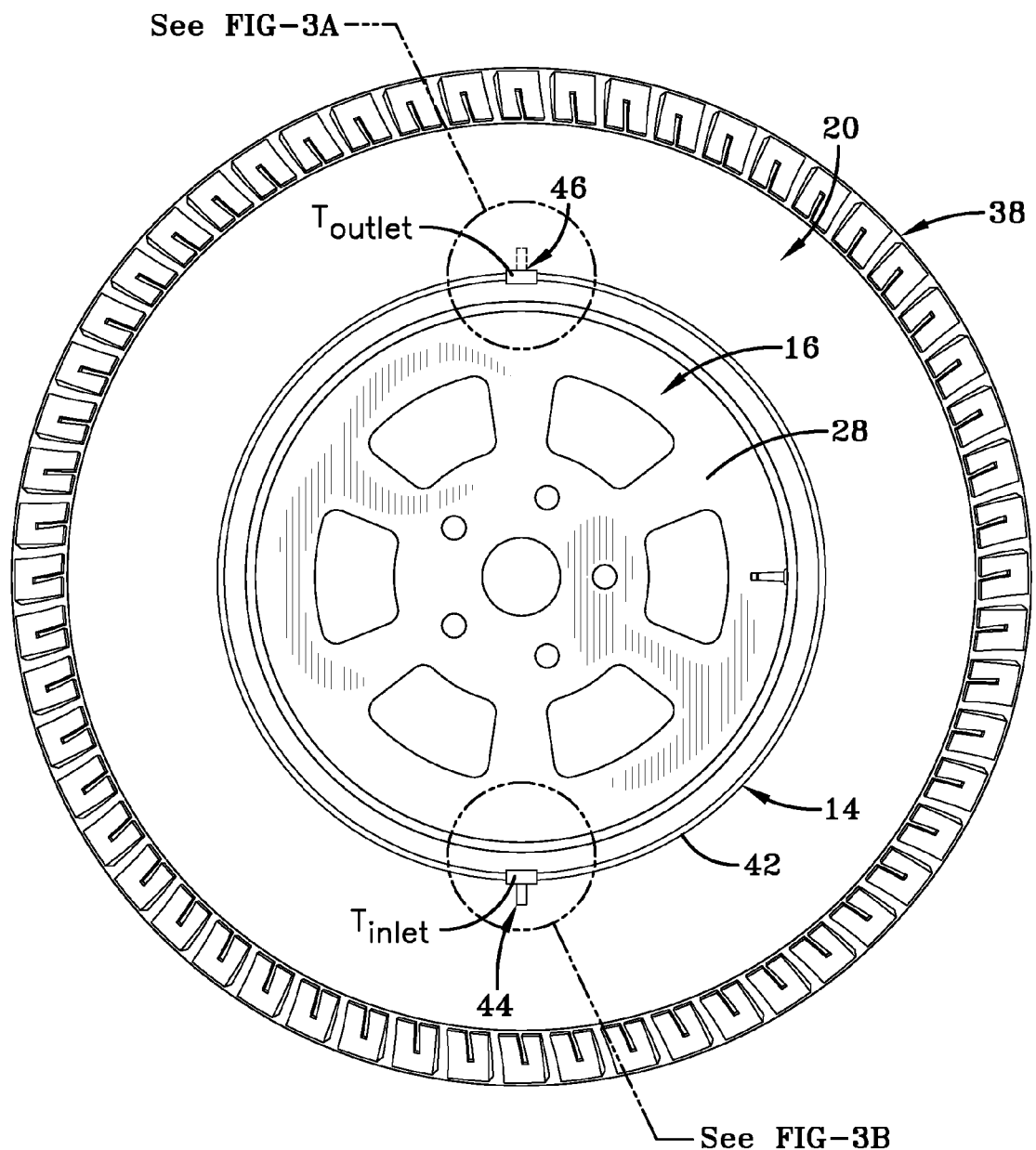
FIG. 2 is a side view of tire with location of tubing and valves and showing user set valve location.

Referring to FIGS. 1 and 2, a tire assembly 10 includes a tire 12, a peristaltic pump assembly 14, and a tire rim 16. The tire mounts in conventional fashion to a pair of rim mounting surfaces 18, 20 adjacent outer rim flanges 22, 24. The rim flanges 22, 24, each have a radially outward facing surface 26. A rim body 28 supports the tire assembly as shown. The tire is of conventional construction, having a pair of sidewalls 30, 32 extending from opposite bead areas 34, 36 to a crown or tire tread region 38. The tire and rim enclose a tire cavity 40.

Figure 3A:
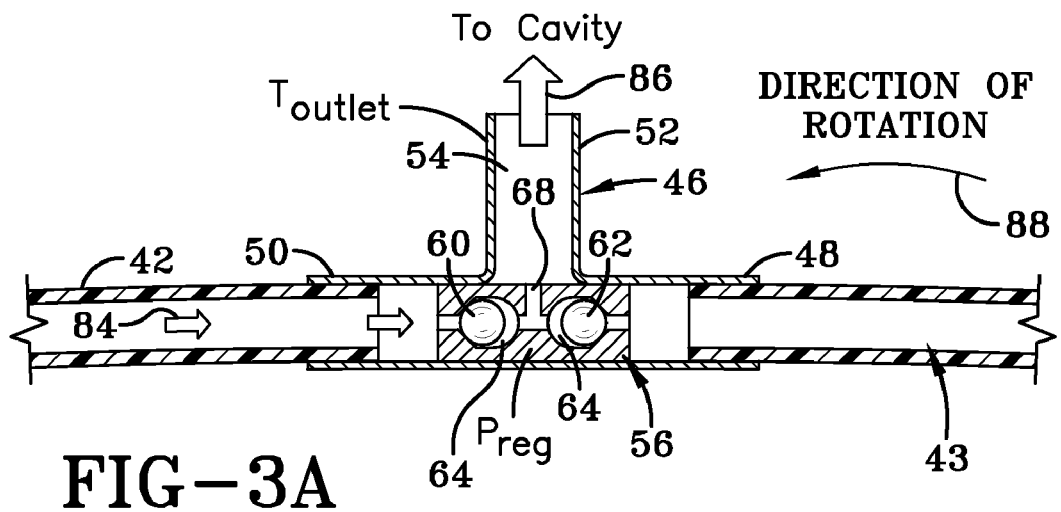
FIG. 3A is an enlarged fragmentary view of pump for outlet to tire cavity.

As seen from FIGS. 2 and 3A, B, and C, the peristaltic pump assembly 14 includes an annular air tube 42 that encloses an annular passageway 43. The tube 42 is formed of a resilient, flexible material such as plastic or rubber compounds that are capable of withstanding repeated deformation cycles wherein the tube is deformed into a flattened condition subject to external force and, upon removal of such force, returns to an original condition generally circular in cross-section. The tube is of a diameter sufficient to operatively pass a volume of air sufficient for the purposes described herein and allowing a positioning of the tube in an operable location within the tire assembly as will be described.

The peristaltic pump assembly 14 further includes an inlet device 44 and an outlet device 46 spaced apart approximately 180 degrees at respective locations within the air tube 32. The outlet device 46 has a T-shaped configuration in which T-sleeves 48, 50 join at one end to an outlet sleeve 52. An internal outlet passageway 54 extends through the outlet sleeve 52 and is in air flow communication with the tire cavity 40. Situated within an axial chamber of each of the T-sleeves 48, 50 is a valve unit 56 positioned opposite and in air-flow communication with the outlet passageway 54 of the outlet sleeve 42. The valve unit 56 is of a conventional type commercially available, and includes a pair of one-way ball valves 60, 62, each seated within a respective ball valve chamber 64. The ball valves 60, 62 are spring biased (not shown) in conventional manner into a normally closed configuration closing off the outlet passageway 54. When air from the passageway 43 impinges on the ball valves 60, 62 with a sufficient pressure to overcome the tire cavity biasing pressure, the ball valves move rearward and the T-outlet is open to the passage of air from passageway 43 out of the outlet passageway 54. The magnitude of bias necessary for the air from passageway 43 to overcome can be set so as to regulate the flow of air out of the outlet device 46 by also incorporating a biasing spring (not shown) against each ball valve 60, 62, biasing with the tire cavity pressure the ball valves into a closed position. The air from tube passageway 43 must be of sufficient pressure to overcome the tire cavity pressure and biasing spring pressure for the ball valves to move into an open position, whereby starting a flow of air into the tire cavity 40.

The inlet device 44 is similarly of T-shaped configuration having a pair of co-axial inlet sleeves 70, 72 co-aligned with an inlet portal sleeve 74. An air passageway 76 extends through the inlet portal sleeve 74 and permits the flow of air into and out of the air passageway of the tube 42, via passageway 78. A filter 80 may be positioned within the inlet portal sleeve 74. Filter 80 is composed of a porous filtering agent of a type conventionally available. So positioned within the sleeve 74, the filter 80 purifies air entering the tube passageway 43, identified in FIG. 3B as "outside air". A back flow of air out of passageway 43, through the filter 80 within sleeve 74, operates to self-clean the filter by forcing our particles trapped within the porous filtering medium. An insert T-body 82 resides within the inlet device 44 and serves to line the sleeves 70, 72.

As will be appreciated from FIGS. 3A-C and 4A, the inlet device 44 and the outlet device 46 are positioned within the circular air tube 42 generally 180 degrees apart. The tire rotates in a direction of rotation 88, causing a footprint 100 to be formed against the ground surface 98. A compressive force 104 is directed into the tire from the footprint 100 and acts to flatten a segment of the air tube passageway 43 as shown at numeral 106. Flattening of the segment of the passageway 43 forces air from the segment along tube passageway 43 in the direction shown by arrow 84, toward the outlet device 46.

As the tire continues to rotate in direction 88 along the ground surface 98, the tube 42 will be sequentially flattened or squeezed opposite the tire footprint segment by segment in a direction opposite to the direction of tire rotation 88. The sequential flattening of the tube passageway 43 segment by segment causes evacuated air from the flattened segments to be pumped in the direction 84 within tube passageway 43 to the outlet device 46. When the air flow is sufficient against ball valve 60, the valve will open and allow air to flow through the outlet device 46 to the tire cavity as shown at 86. As referenced by arrow 86, air exiting the outlet device sleeve 52 is routed to the tire cavity 40 and serves to re-inflate the tire to a desired pressure level. The tire cavity pressure acts against the ball valves 60, 62 in combination with any ancillary biasing spring (not shown) which must be overcome by the air pressure within the tube passageway 43 in order for the ball valve to open.

Figure 3B:
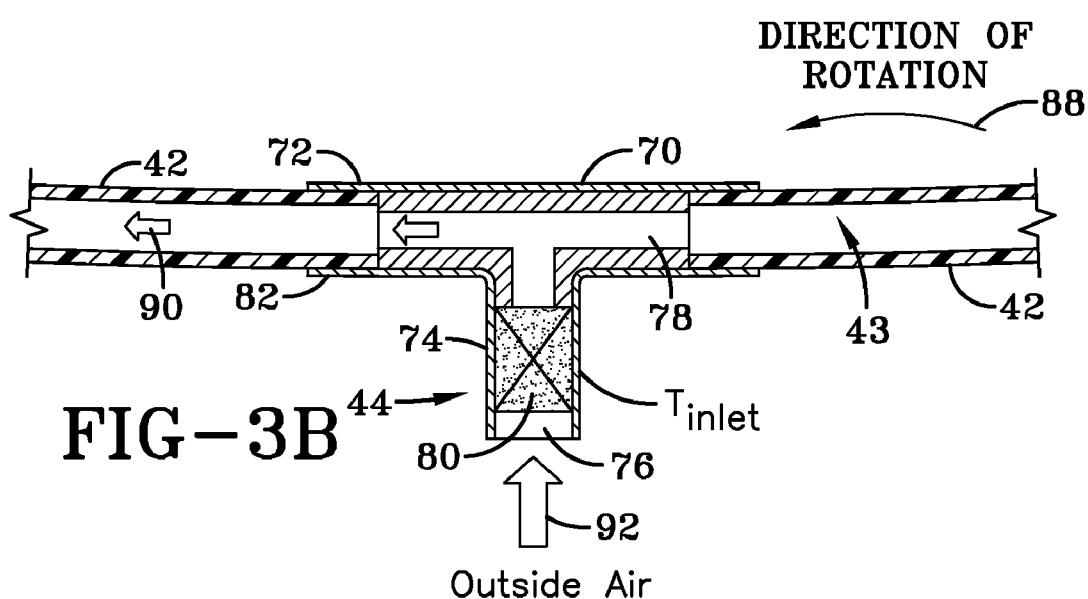
FIG. 3B is enlarged fragmentary view of inlet and filter.
Figure 3C:
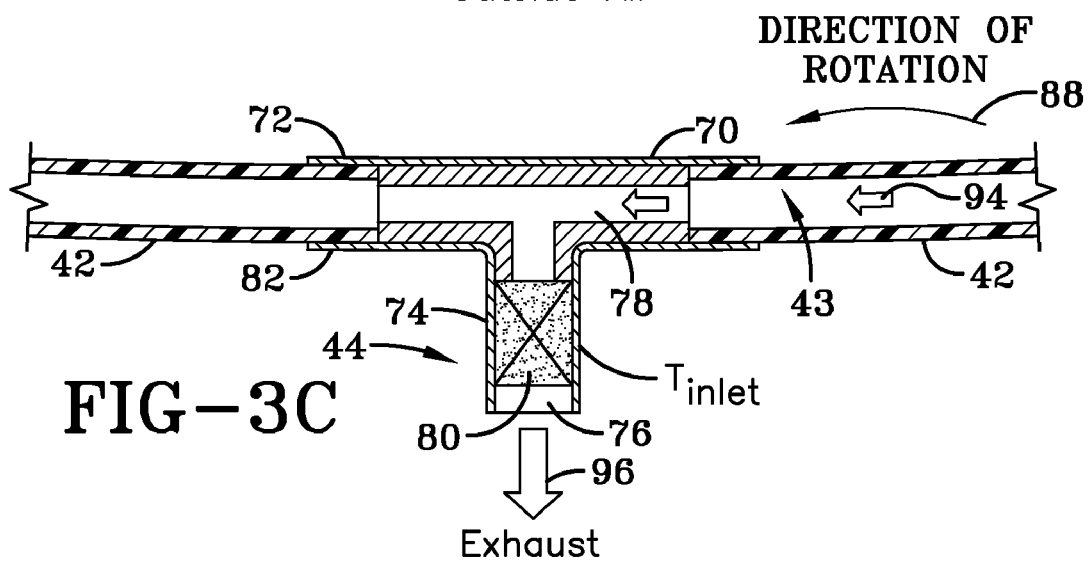
FIG. 3C is an enlarged fragmentary view of inlet and filter in the exhaust mode.
Figure 4A:
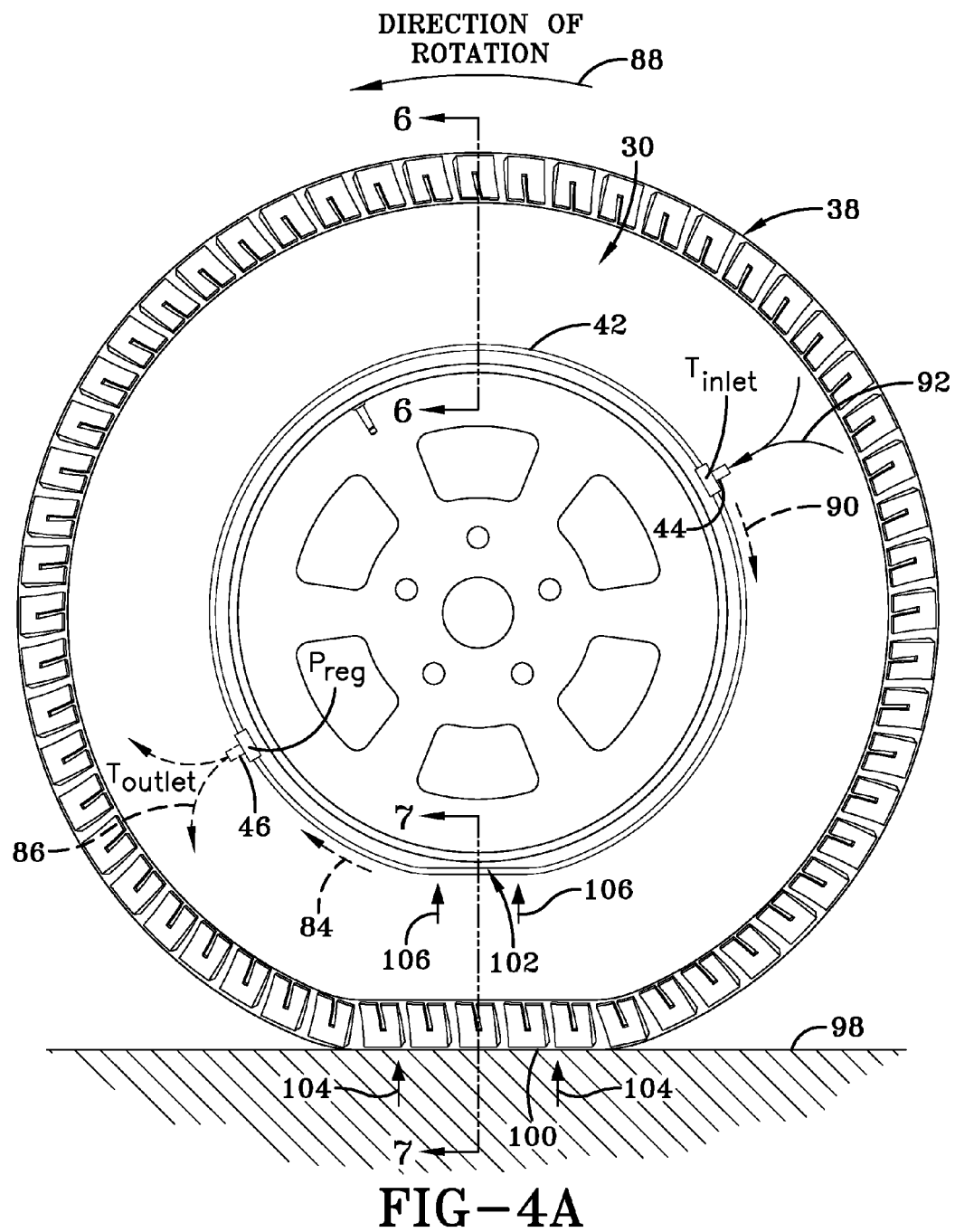
FIG. 4A is a side view of tire, rim, tubing, and valves showing operation of the pump to cavity flow when the tire rotates.
Figure 4B:
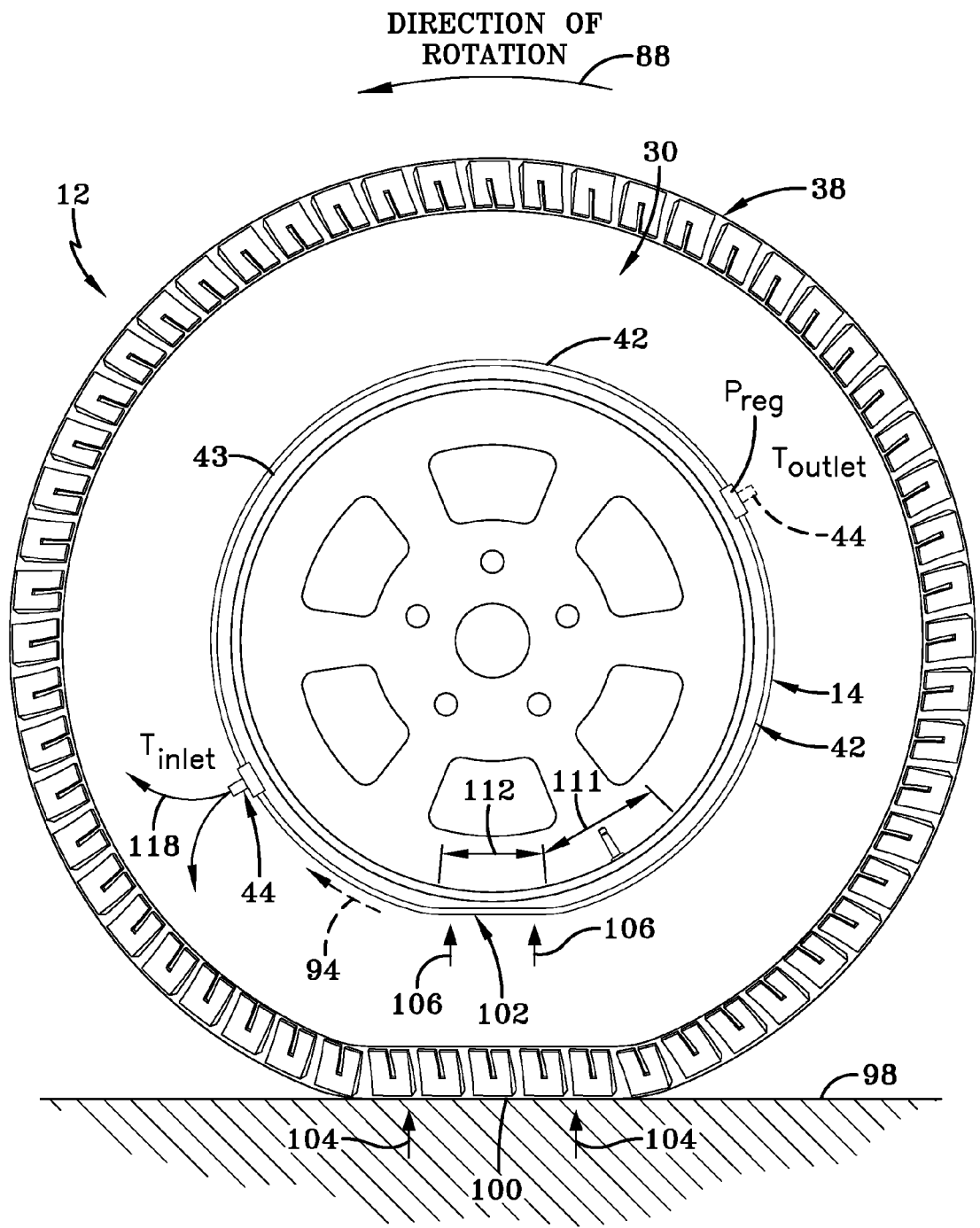
FIG. 4B is a side view of the tire, rim, tubing, and valves showing operation of flow back out of the filter (cleaning) when the tire rotates.

With the tire rotating in direction 88, flattened tube segments are sequentially refilled by air 92 flowing into the inlet device 44 along the passageway 43 in the direction 90 as shown by FIGS. 3B and 4A. The inflow of air from the inlet device 44 in direction 90 continues until the outlet device 46, rotating counterclockwise as shown with the tire rotation 88, passes the tire footprint.100. FIG. 3C and FIG. 4B show the orientation of the peristaltic pump assembly 14 in such a position. In the position shown, the tube 42 continues to be sequentially flattened segment by segment opposite the tire footprint by compressive force 104 as shown at numeral 106. Air is pumped in the clockwise direction 94 to the inlet device 44 where it is evacuated or exhausted from the passageway 43. Passage of exhaust air 96 from the inlet device 44 is through the filter 80 which acts to self-clean the filter of accumulated debris or particles within the porous medium. With the evacuation of pumped air out of the inlet device 44, the outlet device is in the closed position and air does not flow to the tire cavity. When the tire rotates further in counter-clockwise direction 88 until the inlet device 44 passes the tire footprint 100 (as shown in FIGS. 3A, 3B, and 4A), the airflow resumes to the outlet device 46, opening the ball valve within the outlet device 46, and causing the pumped air to flow out (86) to the tire cavity 40.

FIG. 4B illustrates that the tube 42 is flattened 102 segment by segment as the tire rotates in direction 88. A flattened segment 111 moves counterclockwise in direction 88 with the tire as an adjacent segment 112 moves opposite the tire footprint. Accordingly, the progression of squeezed or flattened tube segments can be seen to move in a clockwise direction, counter to the tire rotation in direction 88. As segment 111 moves away from the footprint 100, the compression forces within the tire from the footprint region are eliminated and the segment 111 is free to resiliently reconfigure into an unflattened state as segment 111 refills with air from passageway 43. In the original non-flattened configuration segments of the tube 42 are generally circular in section.

The above-described cycle is then repeated for each tire revolution, half of each rotation resulting in pumped air going to the tire cavity and half of the rotation the pumped air is directed back out the inlet device filter 80 to self-clean the filter. It will be appreciated that while the direction of rotation 88 of the tire 12 is shown in FIGS. 4A and 4B to be counter-clockwise, the subject tire assembly and its peristaltic pump assembly 14 will function in like manner in a (clockwise) reverse direction of rotation to that shown at numeral 88. The peristaltic pump is accordingly bi-directional and equally functional with the tire assembly moving in a forward or a reverse direction of rotation.

Figure 5A:
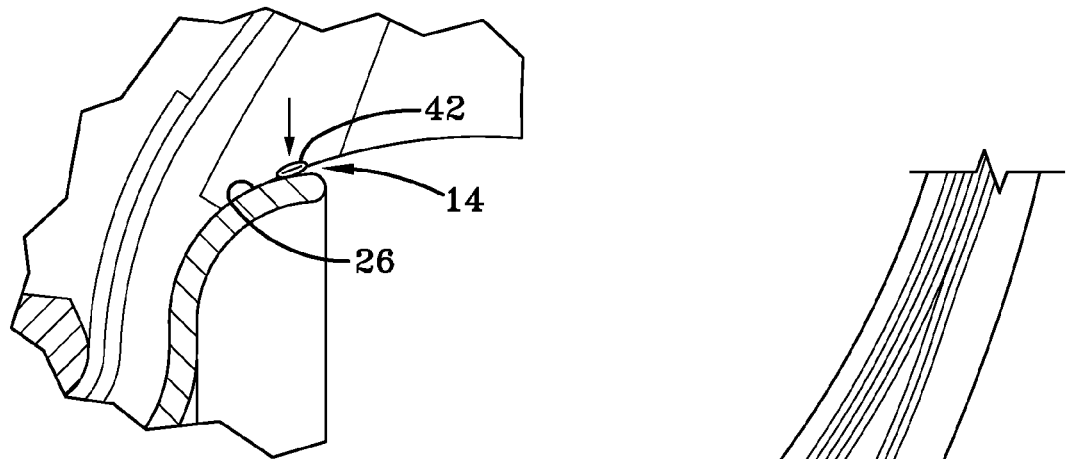
FIG. 5A is an enlarged section view of the prior art air tube and rim location with the air tube in an restored original diameter condition.
Figure 5:
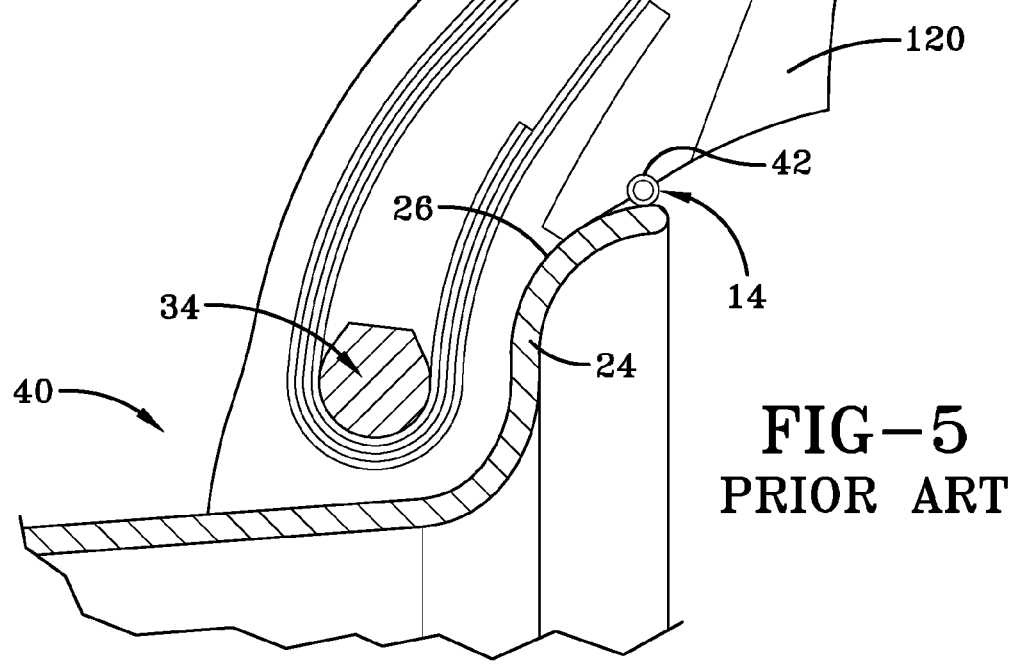
FIG. 5 is an enlarged section view of a prior art flattened air tube and rim location.

One location of the peristaltic pump assembly within the tire assembly 10 will be understood from FIGS. 5 and 5A. As shown, the peristaltic pump assembly 14 is positioned between the rim flange surface 26 and a lower bead region 34 of the tire 12. So positioned, the air tube 42 is radially inward from the tire footprint 100 and is thus positioned to be flattened by forces directed from the tire footprint as described above. The segment or the tube 42 opposite the footprint of a rolling tire will flatten from the compressive force directed from the footprint, whereby pressing the tube segment against the rim flange surface 26. The positioning of the tube 42 is specifically shown as between a chafer 120 of the tire at the bead region 34 and the rim surface 26. The diametric sizing of the peristaltic pump air tube 42 is selected to span the circumference of the rim flange surface 26.

The tube 42 is closed by contact between the tire and the rim surface 26. While such a location is feasible, an exact placement of the tube 42 is required. In addition, possible chafing may occur to the tube 42 from friction with the rim surface 26. Such chafing may over time cause a degradation or failure of the tube 42. In addition, such a location may prove sensitive to rim variations that can make the above-mentioned exact placement of the tube 42 problematic. Placing the tube 42 against the rim surface 26 can further create the risk that the connection will strike the tire valve stem.

A preferred location for the air tube assembly 14 is as shown in FIGS. 6, 6A,6B, 8, and 8A. The tube 42 is located within a groove 126 in the sidewall 30 of the tire 12. The tube 42 as will be explained is closed by compression strain bending the sidewall groove 126 within a rolling tire footprint. The location of the tube 42 in the sidewall 30 affords the user freedom of placement and avoids contact between the tube 42 and the rim 16. The higher placement of the tube 42 in the sidewall groove 126 uses the deformation of the sidewall as it passes through the tire footprint to close the tube and provide the pumping action rather than pinching the tube as shown in FIGS. 5 and 5A.

Figure 6:
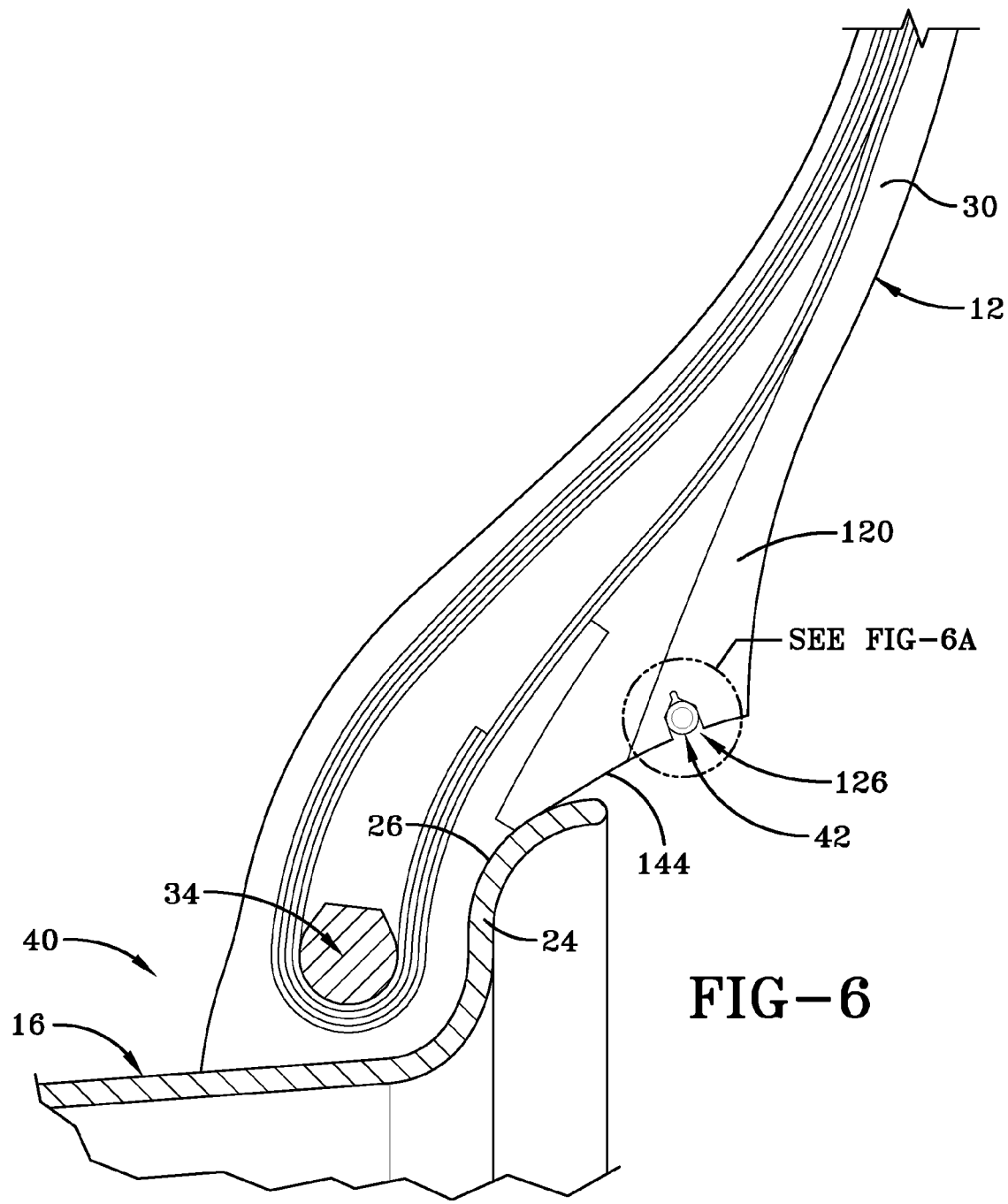
FIG. 6 is a section view of the air tube, tire, and rim assembly with the air tube located within a configured sidewall groove pursuant to the invention.
Figures 6A, 6B:
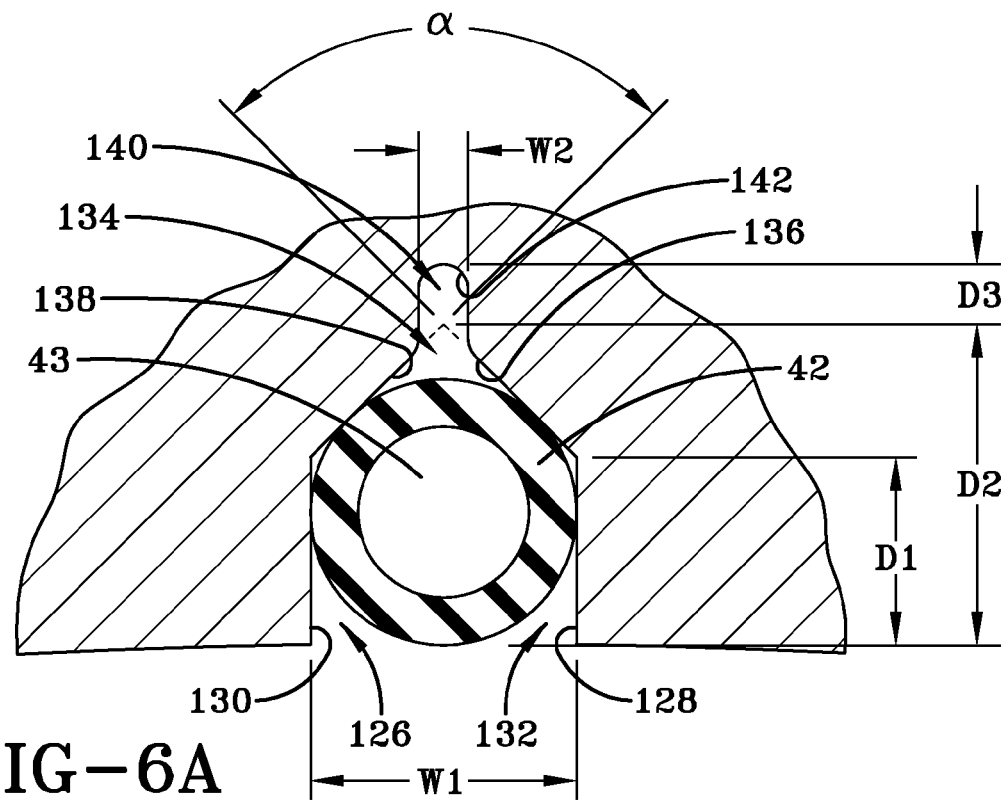
FIG. 6A is an enlarged section view of the air tube within the configured groove of FIG. 6 with the tube in an un-flat condition.
FIG. 6B is an enlarged section view of the air tube within the configured groove of FIG. 6 with the tube in a flattened condition.

The configuration and operation of the groove 126 to flatten the tube 42 is shown in FIGS. 6A and 6B. The groove 126 is defined by parallel entryway sidewalls 128, 130 at a groove entryway opening 132 having a nominal width W1. The width W1 is sufficient to closely admit the tube 42 with interference but without constricting the air passageway 43 extending through the tube 42. An interior generally triangular shaped groove portion 134 is defined between convergent groove sidewalls 136, 138. The sidewalls 136, 138 intersect entryway sidewalls 130, 128, respectively at an obtuse angle. The sidewalls 136, 138 converge inwardly at an angle α of approximately ninety degrees and contact the sides of the tube 42 in the position shown by FIG. 6A. The sidewalls 136, 138 then converge inwardly to an inward U-shaped groove flex region 140 of a narrower width W2 defined between sidewalls 162, 164. The sidewalls 162, 164 intersect respectively sidewalls 136,138 at an obtuse angled junction designated by numerals 166, 168. The sidewalls 162, 166 extend to an inward radius end 142 of the U-shaped groove flex region 140. In the tube-expanded condition of FIG. 6A, the contact of surfaces 136, 138 and 128, 130 against the tube 42 is sufficient to hold the tube pump assembly 14 within the groove 126.

The location of the pump assembly 14 within the tire sidewall is distanced from the rim 16 as shown. A preferred location of the pump assembly tube 42 is within a groove 126 positioned in a generally axially extending chafer surface 144. The chafer 120 extends from the rim 16 and the location of the groove 126 within the surface 144 allows a separation of the tube 42 from the rim while efficiently transferring tube closing forces from sidewall deformation to the tube 42. As will be apparent from a combined consideration of FIGS. 4B, 6B, 8, and 8A, the tube 42 positioned within groove 126 is closed or flattened by compression due to tire sidewall 30 bending in the tire footprint 100. The force F from the footprint imposes an axial directed force F1 into the sidewall 30 which acts to close the groove 126 from the open configuration of FIG. 6A to the closed configuration of FIG. 6B. As a result, the entryway opening 132 of the groove 126 constricts to a width dimension W3 and the groove sidewalls 128, 130 and 136, 138 are forced inward. Inward pressure from the sidewalls 128, 130 and 136, 138 against the tube 42 causes the affected segment of the tube 42 to flatten and thereby pump air evacuated therefrom along unaffected segments of the air passageway 43. Surfaces 128, 130 and 136, 138 extend from the narrower inward groove surfaces 162, 164 defining groove portion 134. Compression forces F2 act to close the groove 126 as surfaces 162, 164 and the respective surfaces 128, 130, 136, 138 extending therefrom pivot inwardly about the radiussed end 142 of the groove portion 140. The angled relationship and profile of the surfaces 128, 130 to respective counterparts 136, 138 and 162, 164, extending from the inward U-shaped groove portion 134, act to close such surfaces inward evenly about the circumference of the tube 42 within the groove 126. Accordingly, the compression forces F2 transferred into the tube 42 by the surfaces 128, 130, 136, 138 are distributed about the circumference of the tube, causing an even and symmetrical flattening of the tube 42. An even and efficient pumping of evacuated air from the affected tube segment results. The affected segment of the tube 42 that is flattened is only that segment within the tire footprint 100. As the tire continues to rotate, as described previously, each flattened segment will resume its original configuration as represented in FIG. 6A as an adjacent segment within the tire footprint is flattened.

It will be seen from FIGS. 6A and 6B that the surface pairs 128/136 and 130/138 form a continuous obtuse-angled surface along each side of the groove 126, the angled surface at each side angling away from the center of the groove. The angled surface along each side of the groove adjoins continuously at intersections 166, 168 with the sidewalls 162, 164 of the U-shaped narrow inner groove portion. Compressive forces F2 on the groove 126 causes the angled surfaces formed by surface pairs 128/136 and 130/138 to flex inward toward the groove center about the terminal end 170 of the U-shaped narrow groove portion 140. The spring flexure of the angled surfaces about the terminal end 170 clamps the surface pairs about the circumference of a segment of the tube 42 and causes the segment to flatten inwardly. The spring force applied by the angled surfaces on the flattened groove segment is released when the compressive forces F2 are removed from the groove 126. At this point, the grooved surfaces formed by adjoining surfaces by the tube segment 128/136 and 130/138 flex outwardly to an original orientation along the sides of the groove 126, releasing the flattened tube segment to reconfigure into a non-flat configuration.

Figure 7A:
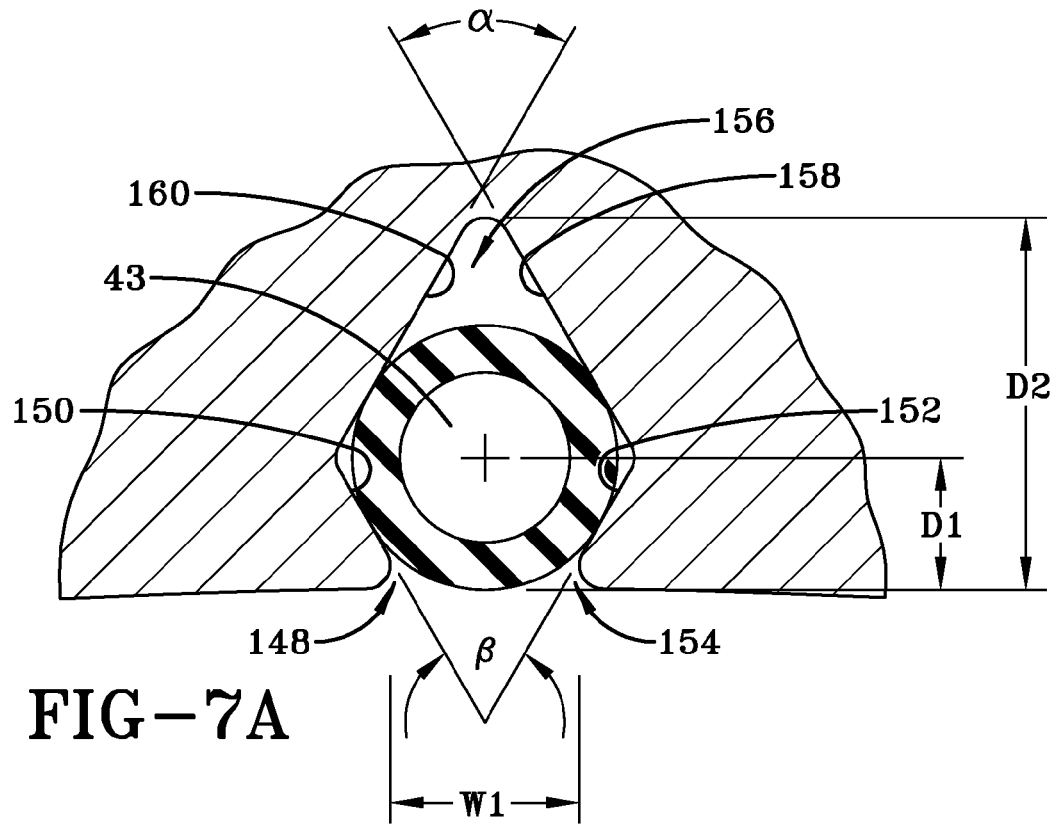
FIG. 7A is an enlarged section view of an air tube located within an alternatively configured sidewall groove with the air tube in an un-flattened condition.
Figure 7B:
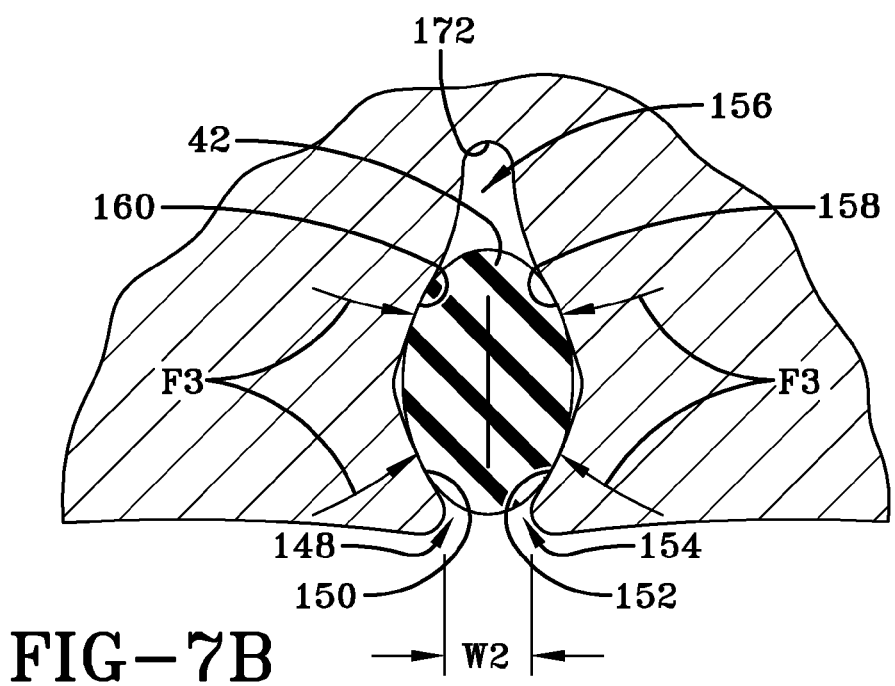
FIG. 7B is an enlarged section view of the air tube in a flattened condition within the alternatively configured groove of FIG. 6.
Figure 8A:
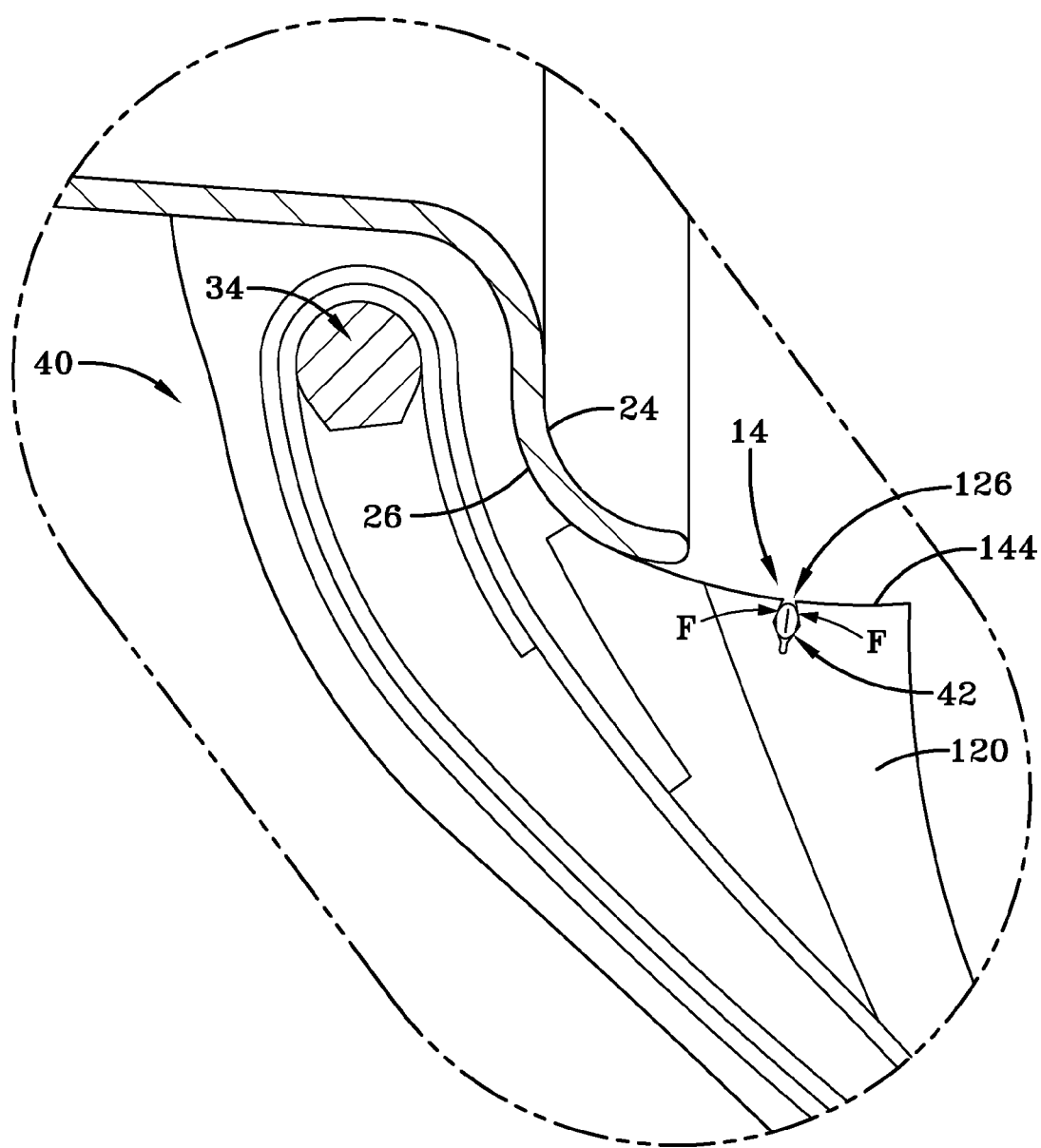
FIG. 8A is an enlarged view of the identified region of FIG. 8, showing a flattened air tube and sidewall groove within a tire sidewall.

FIGS. 7A and 7B show an alternatively configured groove 148 defined between angled adjoining surfaces 150/160 and 152/158. The angled sides of the groove 148 extend to a terminal end 172 of a radiussed inward portion of the groove 148. The surfaces 150, 152 diverge at an angle β of approximately sixty degrees to a mid-section of the tube and converge at a like angle α to the terminal end 172. FIG. 7A shows the groove or channel 148 in a non-compressed configuration. The groove entryway opening 154 has a relatively wider width dimension W1 that is smaller than the nominal expanded diameter of the tube 42. Accordingly, the tube 42 may be press inserted through the opening 154 and be subsequently captured within the groove 148.

FIG. 7B shows the groove 148 in a compressed configuration subject to compression forces F3. As with the groove 126 described previously, bending of the groove 148 causes surfaces 150/160 and 152/158 to press inward against the circumference of air tube 42, causing a segment of the air tube 42 within a tire footprint to evenly flatten in a controlled fashion. The surfaces 150/160 and 152/158 are angled to distribute compressive force against the circumference of the tube 42. In the compressed state, the opening W2 is reduced to a narrower width dimension as shown. The angles α and β as well as the groove dimensions W1 and W2 identified in the groove configuration of FIGS. 6A, 6B and the configuration of FIGS. 7A, 7B will be suitably correlated to the diameter of the tube 42 selected. The angles and groove widths functionally sufficient to cause the groove sidewalls to engage the tube 42 within the groove may be readily determined as a function of the diameter of the tube 42 employed.

From the forgoing, it will be appreciated that the subject invention provides a bi-directionally peristaltic pump for a self-inflating tire in which a circular air tube 42 flattens segment by segment and closes in the tire footprint 100. The air inlet T-device 44 may include a filter 80 and be self-cleaning. The outlet T-device 46 employs a valve unit that may be configured as two one-way valves such as, but not limited to, the ball valves 60, 62. The peristaltic pump assembly 14 pumps air under rotation of the tire in either direction, one half of a revolution pumping air to the tire cavity 40 and the other half of a revolution pumping air back out of the inlet device 44 (filter 80). The peristaltic pump assembly 14 may be used with a secondary tire pressure monitoring system (TPMS) (not shown) of conventional configuration that serves as a system fault detector. The TPMS may be used to detect any fault in the self-inflation system of the tire assembly and alert the user of such a condition.

From the foregoing, it will be appreciated that the subject invention achieves a self-inflating tire assembly 10 including the rim 16, tire 12; and air tube assembly 14 located within the tire sidewall groove 126. The air tube 42 is in contacting engagement with opposite angled groove surfaces (128/136 and 130/138) surrounding the air tube 42. The air passageway 43 of a footprint segment of the air tube 43 is flattened from an expanded diameter to a flat diameter by compression of the groove in a rolling tire footprint to force air evacuated from the flattened segment along the air passageway 43.

It will be further noted that each of the surfaces 128, 130, 136, 138 of the angled groove defining surfaces (128/136 and 130/138) adjoining at an angled intersection and operatively contact the air tube 42 at spaced apart intervals surrounding and substantially circumscribing the air tube 42. An efficient and even collapse of the footprint segment of the air tube 42 by convergence of the contacting surfaces is thereby facilitated. The first and second angled groove surfaces (128/136 and 130/138) converge and join at an inward terminal groove end 170 and operatively flex inwardly about the terminal groove end 170 to constrict the sidewall groove 126 and flatten a footprint segment of the air tube 42 within the groove 126.

The sidewall groove 126 extends in a radial direction (FIG. 6) preferably but not necessarily into an annular, axially extending, sidewall surface such as an axially oriented surface 144 of a tire chafer protrusion 120. So located, the tube is in non-contacting, separated relationship with the rim 16 and protected from potentially damaging contact with the rim by the intervening chafer protrusion 120. Such a location, while protecting the tube 42, still exposes the groove 126 to adequate compression forces within the tire footprint. The compression forces generated within the tire footprint operate to close the groove 126 upon a footprint tube segment within the groove. Flattening of the footprint tube segment pumps evacuated air along the air passageway 43 to the tire cavity or to an outlet portal.

Figure 9A:
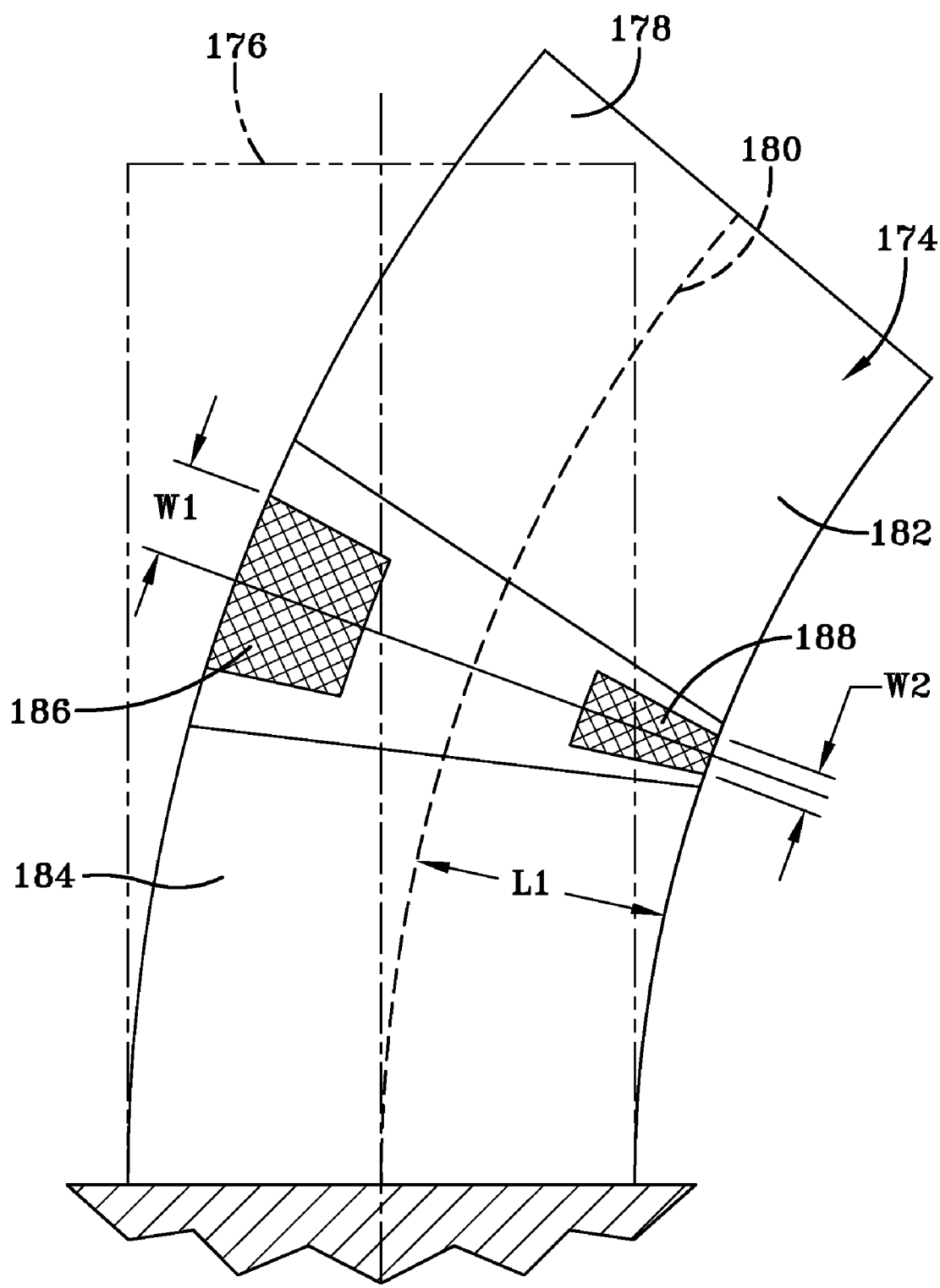
FIG. 9A is a schematic representation of a bending region of a tire sidewall adjacent a rolling tire footprint.
Figure 9B:
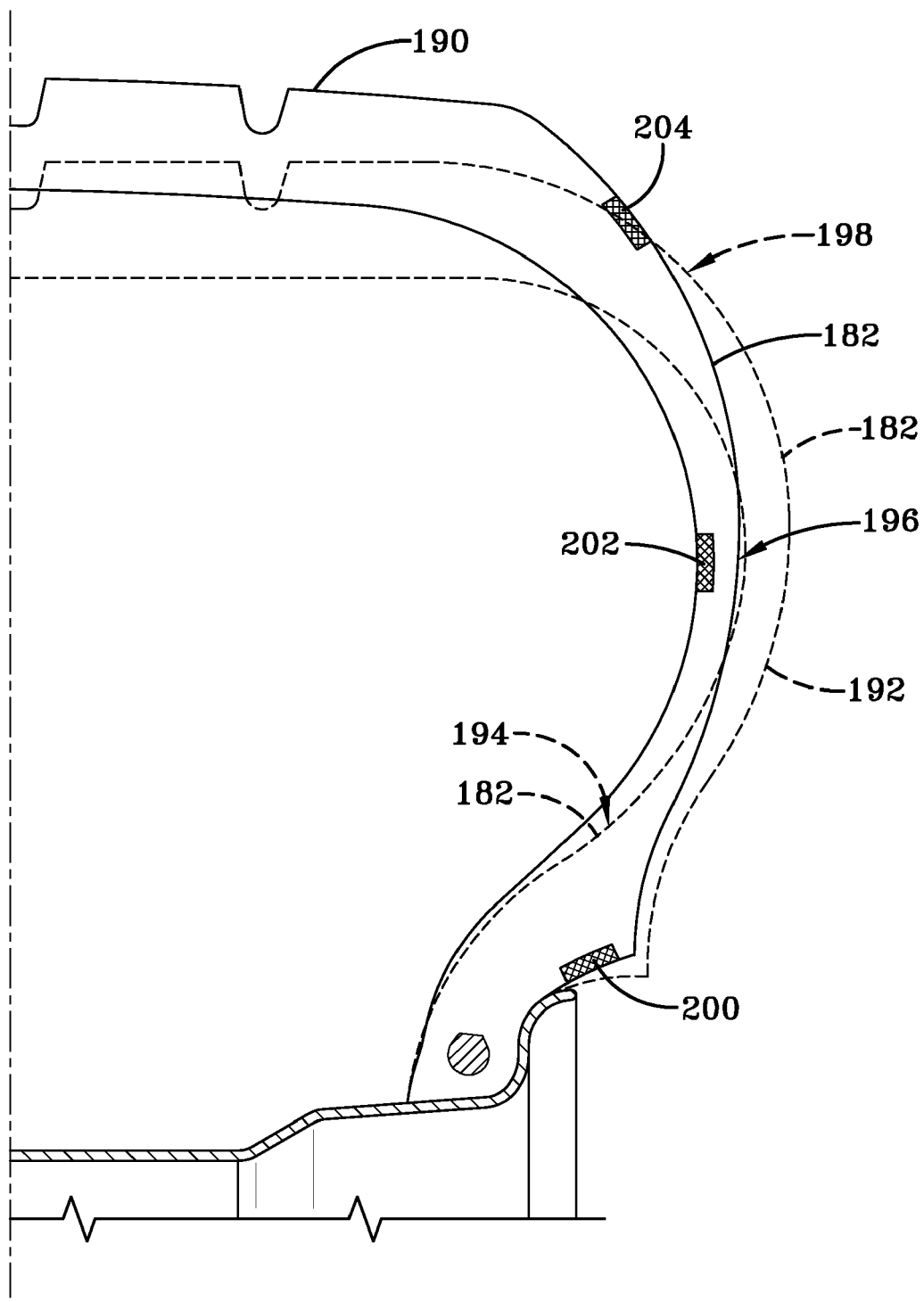
FIG. 9B is a schematic representation of a tire transforming from an original configuration into a bending configuration adjacent a rolling tire footprint, whereby forming multiple bending regions.

FIGS. 9A and 9B illustrate in schematic representation the placement of the groove and air tube within a tire. As will be appreciated, the sidewalls of a rolling tire generally bend and undergo a geometric transformation from bending strain introduced into the sidewalls as the tire rolls against a ground surface. The bending strain within sidewall regions adjacent to a tire footprint causes the radius of curvature within certain such sidewall regions of the sidewalls to bend to a greater extent. In a bending region 174 of a sidewall, the region transforms from the unstrained configuration shown at 176 into the bending configuration shown at 178. In the bending condition, the region 174 will have a neutral axis 180 that is not under strain; a compression side 182 of the neutral axis 180 of the region 174 that is under compression, and an elongation side of the neutral axis 180 of the region 174 that under elongation. For placement of the groove and air tube, a bending region of the sidewall is selected that will experience bending strain when that region is adjacent to the tire footprint. The compression side 182 of the region 174 is satisfactory for placement of the groove and tube assembly 188 since a compression of the side 182 of the region 174 will cause the groove to close around the air tube. To the contrary, the elongation side 184 of the region 174 is unsatisfactory for such a side under elongation strain, will cause the groove to widen rather than close, and not result in a flattening of the tube. Placement of the groove and tube assembly 188 should further be placed within the compression side 182 of the region 178 at a location farthest removed from the neutral axis 180, for such a location will experience the greatest compression strain. Location of the groove and tube 188 farthest from the neutral axis 180 of the selected bending region 174 will accordingly expose the groove to maximum closing due to a maximum compression force and bending imposed upon the tire region surrounding the groove. As a result, efficient and complete closing and collapse of the groove will be effected, causing an equally efficient and complete flattening of the air tube within the groove.

FIG. 9B illustrates in schematic form three sidewall regions of a sidewall that undergo curvature bending transformation when adjacent to a tire footprint. The original tire shape 190 is shown and configuration 192 is superimposed to show tire deformation adjacent to a tire footprint. Three bending regions 194, 196, 198 (for the purpose of illustration) are identified that will undergo strain-induced radius of curvature transformation adjacent a rolling tire footprint. Other regions are available and may be selected for groove and air tube placement if desired. As shown, bulging of the tire into the configuration 178 causes the regions 194, 196, 198 to bend to a greater extend (i.e. at a reduced radius) than within the original configuration 176. Each region 194, 196, 198 will have a neutral, unstrained axis, a compression side of the axis, and an elongation side of the axis as explained above in reference to FIG. 9A. A groove and tube assembly 200, 202, or 204 will be positioned to the compression side 182 of the region selected, so that the compression of the compression side 182 will act to bend and constrict a segment of the groove adjacent to the tire footprint. Bending and constriction of the groove segment adjacent the tire footprint will commensurately cause a bending and flattening of an air tube segment within the bending groove segment, whereby pumping evacuated air from the flattened air tube segment along the air tube passageway. Positioning the groove and air tube within a bending region of the sidewall thus operates to utilize the bending compression strain within the region to effect a bending and collapse of the groove segment within the bending region.

Utilizing the bending strain within a bending region of a sidewall avoids the need to compress the air tube by pinching the air tube against a relatively hard barrier such as the tire assembly rim. Potential damage to the air tube from contact with the rim is thus avoided and the structural integrity of the air tube is preserved throughout the life cycle of the tire.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A self-inflating tire assembly comprising:
   a rim having a tire mounting surface extending between first and second rim flanges;
   a tire mounted to the rim tire mounting surface, the tire having a tire cavity, first and second sidewalls extending respectively from first and second tire bead regions to a tire tread region;
   the first sidewall having at least one bending region operatively bending within a rolling tire footprint responsive to a bending strain, whereby the bending region in a bending condition within said rolling tire footprint having a bending strain neutral axis, a compression side of the neutral zone, and an elongation side of the neutral zone;
   a sidewall groove positioned within the compression side of the neutral axis of the one said bending region of the first tire sidewall;
   an air tube positioned within the sidewall groove in contacting engagement with opposite groove surfaces at least partially surrounding the air tube, the sidewall groove operatively bending within the bending region responsive to the bending strain within the rolling tire footprint to compress the air tube from an expanded diameter to a flat diameter adjacent the rolling tire footprint, whereby forcing evacuated air from a flattened air tube segment along the air passageway.

2. The tire assembly of claim 1, wherein the air tube and the sidewall groove are located within a sidewall region of the first tire sidewall above an upper boundary of the rim.

3. The tire assembly of claim 2, wherein the groove surfaces contact the air tube and bend within a footprint of a rotating tire to operatively close an air tube segment within the tire footprint.

4. The tire assembly of claim 3, wherein the air tube comprises an annular body extending substantially a circumference of a tire first sidewall.

5. The tire assembly of claim 4, wherein the sidewall groove is annular and located proximally above the upper boundary of the rim.

6. The tire assembly of claim 1, wherein the groove extends into an annular, substantially axially extending, sidewall surface.

7. The tire assembly of claim 6, wherein the annular sidewall surface comprises a substantially axially oriented surface of a tire chafer protrusion located in non-contacting relationship with the rim, the groove extending into the annular sidewall surface in substantially a radial direction.

8. The tire assembly of claim 1, wherein the sidewall groove includes a sidewall groove opening operatively sized to closely admit the air tube.

9. The tire assembly of claim 8, wherein substantially the entirety of the air tube resides within the sidewall groove.

10. The tire assembly of claim 9, wherein first and second angled groove surfaces define opposite sides of the sidewall groove, each angled groove surface comprising first and second tube contacting surfaces adjoining at an angled intersection, and wherein the tube contacting surfaces of the first and second angled groove surfaces operatively contact the air tube at space apart intervals surrounding and substantially circumscribing the air tube.

11. The tire assembly of claim 10, wherein the first and second angled groove surfaces converge and join at an inward terminal groove end and operatively flex inwardly about the terminal groove end to constrict the sidewall groove and flatten a footprint segment of the air tube within the groove.

12. The tire assembly of claim 11, wherein the groove narrows toward the terminal groove end.

13. The tire assembly of claim 12, wherein an inward portion of the groove at the terminal groove end is substantially U-shaped.

14. The tire assembly of claim 13, wherein the first and second angled groove surfaces converge toward the inward portion of the groove.

15. The tire assembly of claim 14, wherein the groove extends into an annular, substantially axially extending, sidewall surface.

16. The tire assembly of claim 15, wherein the annular sidewall surface comprises a substantially axially oriented surface of a tire chafer protrusion located in non-contacting relationship with the rim and the groove extending into the annular sidewall surface in substantially a radial direction.

17. The tire assembly of claim 1, wherein the sidewall groove is positioned within the compression side of the neutral axis of the one said bending region of the first tire sidewall at a substantially maximum distance from the neutral axis.

18. A self-inflating tire assembly comprising:
a rim having a tire mounting surface extending between first and second rim flanges;
a tire mounted to the rim tire mounting surface, the tire having a tire cavity, first and second sidewalls extending respectively from first and second tire bead regions to a tire tread region;
the first sidewall having at least one bending region operatively bending within a rolling tire footprint responsive to a bending strain, whereby the bending region in a bending condition within said rolling tire footprint having a bending strain neutral axis, a compression side of the neutral zone, and an elongation side of the neutral zone;
a sidewall groove extending into an outward facing side of the sidewall and positioned within the compression side of the neutral axis of the one said bending region of the first tire sidewall, the sidewall groove being at least partially open to the outward facing side of the sidewall;
an enclosed air conducting air tube positioned within the sidewall groove in contacting engagement with opposite groove surfaces at least partially surrounding the air tube, the sidewall groove operatively bending within the bending region responsive to the bending strain within the rolling tire footprint to compress the air tube between the opposite groove surfaces from an expanded diameter to a flat diameter adjacent the rolling tire footprint, whereby forcing evacuated air from a flattened air tube segment along the air passageway.

19. The tire assembly of claim 18, wherein the sidewall groove and the air tube therein are recessed within the first tire sidewall outward facing side.

* * * * *